United States Patent [19]

Regueiro

[11] Patent Number: 5,320,075

[45] Date of Patent: Jun. 14, 1994

[54] INTERNAL COMBUSTION ENGINE WITH DUAL IGNITION FOR A LEAN BURN

[75] Inventor: Jose F. Regueiro, Rochester Hills, Mich.

[73] Assignee: Chrysler Corporation, Highland Park, Mich.

[21] Appl. No.: 28,863

[22] Filed: Mar. 10, 1993

[51] Int. Cl.⁵ .............................................. F02P 15/02
[52] U.S. Cl. ................................. 123/310; 123/193.6; 123/306
[58] Field of Search .................... 123/310, 309, 193 P, 123/193.6, 306

[56] References Cited

U.S. PATENT DOCUMENTS

| | | | |
|---|---|---|---|
| 3,945,365 | 3/1976 | Regueiro | 123/191 |
| 4,111,177 | 9/1978 | Regueiro | 123/32 ST |
| 4,759,323 | 7/1988 | August | 123/193 P |
| 4,831,919 | 5/1989 | Bruni | 123/193.6 |
| 4,844,025 | 7/1989 | Sheaffer | 123/310 |
| 4,864,986 | 9/1989 | Bethel et al. | 123/193.6 |
| 4,924,824 | 5/1990 | Parsons | 123/193.6 |
| 4,957,212 | 9/1990 | Duck et al. | 123/193.6 |
| 4,958,616 | 9/1990 | Di Nunzio et al. | 123/310 |
| 5,007,394 | 4/1991 | Brychta et al. | 123/193.6 |
| 5,105,795 | 4/1992 | Ozawa et al. | 123/310 |
| 5,261,367 | 11/1993 | Yamamoto et al. | 123/309 |
| 5,269,270 | 12/1993 | Suzuki et al. | 123/310 |

OTHER PUBLICATIONS

*Automotive Industries*, John McElroy, "Alternative Engines", Jan., 1980, pp. 43–48.
*Technology Review*, John Heywood and John Wilkes, "Is There a Better Automobile Engine?", Nov./Dec. 1980, pp. 19–29.

*Primary Examiner*—Raymond A. Nelli
*Attorney, Agent, or Firm*—Kenneth H. MacLean

[57] ABSTRACT

An internal combustion engine (10) with dual ignition has two spark plugs (70) and (72) mounted in a cylinder head (16) that forms a combustion chamber (44) in conjunction with the cylinder (14) and piston (18). The spark plugs sequentially ignite the lean air-fuel mixture in the combustion chamber towards the end of the compression stroke. The piston (18) has a recess (80) of variable width and depth that has its narrow portion in proximity to the spark plug (70) and wider and deeper portion aligned under spark plug (72). The ignition by spark plug (72) is delayed with respect to the ignition by spark plug (70).

24 Claims, 3 Drawing Sheets

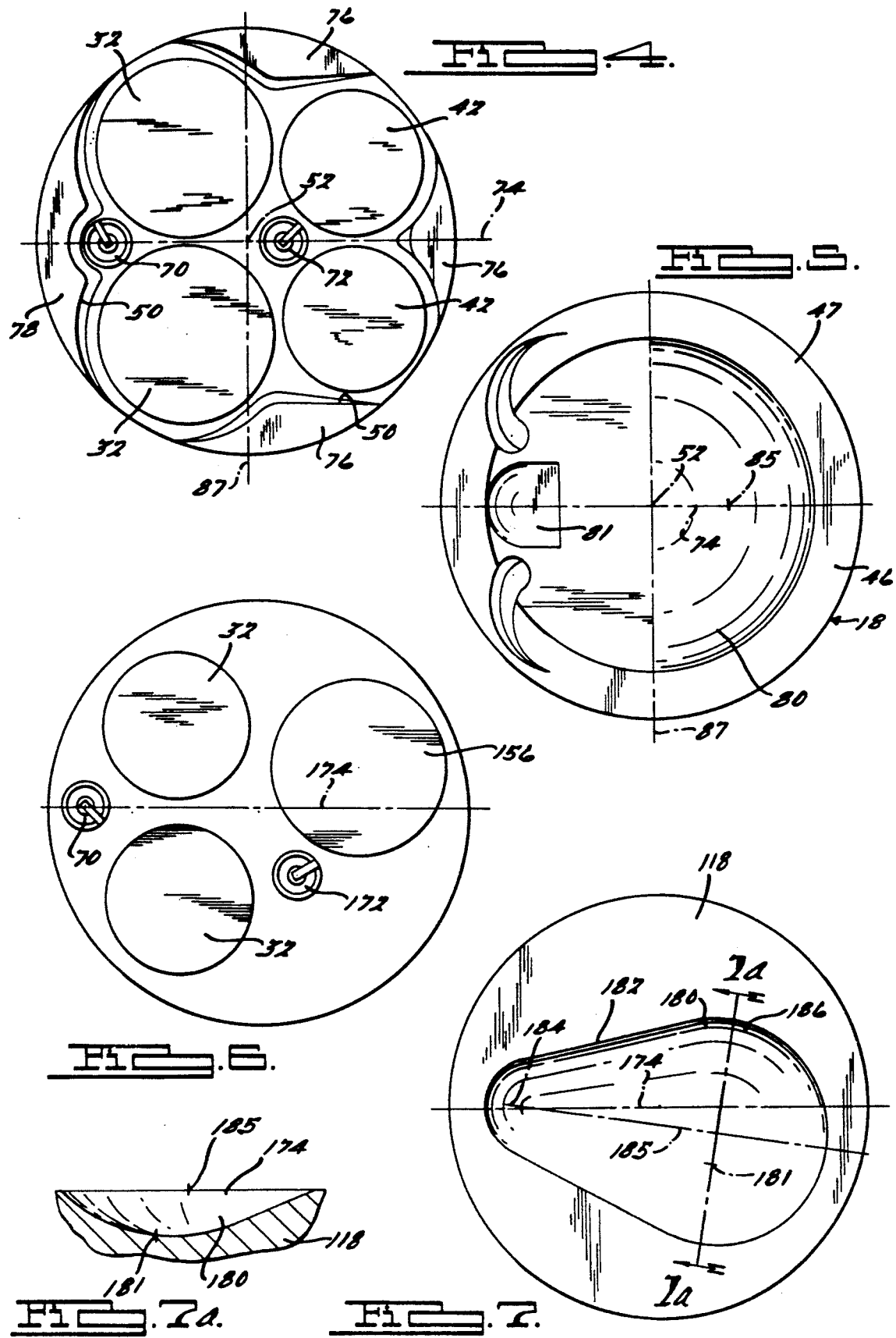

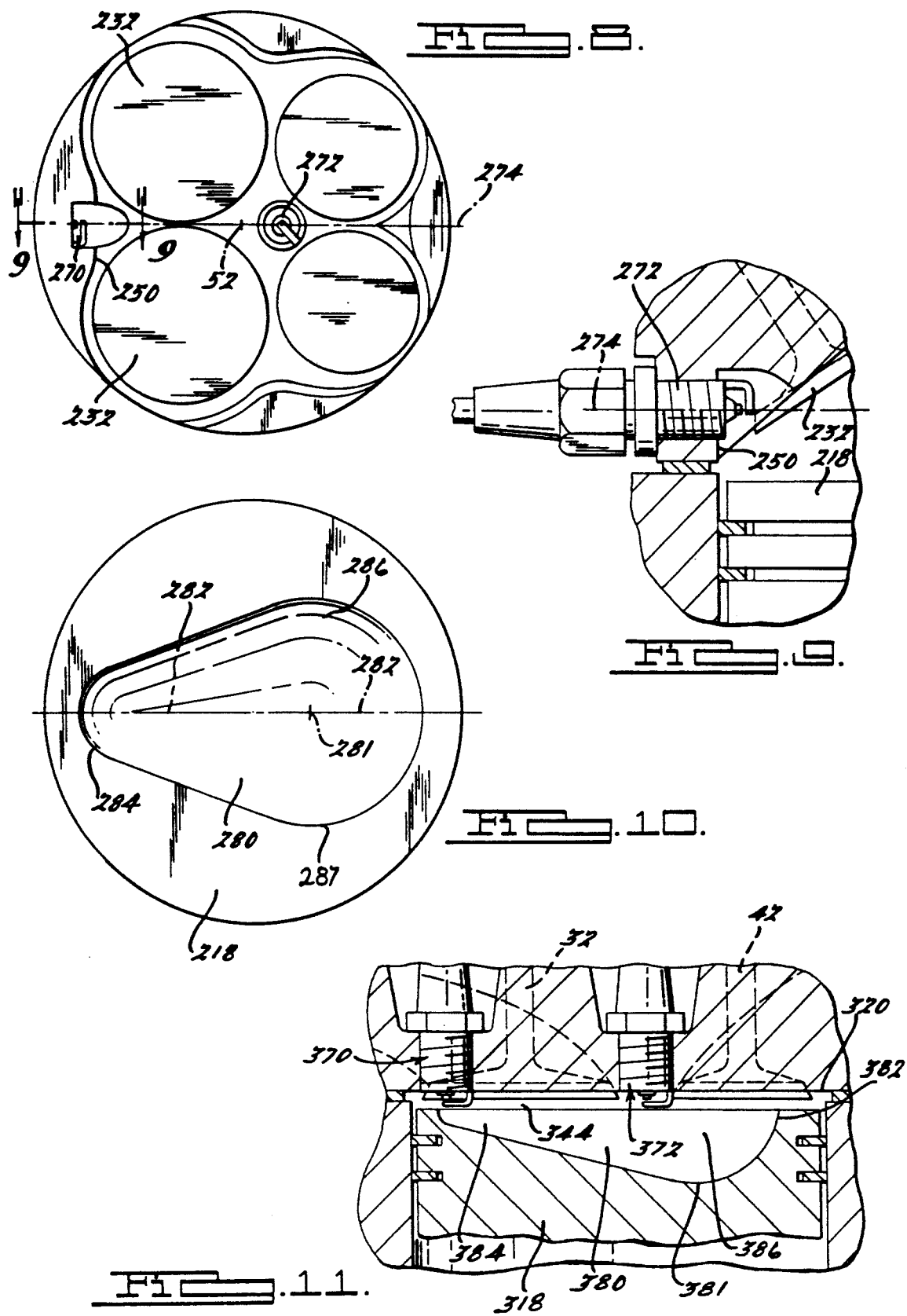

INTERNAL COMBUSTION ENGINE WITH DUAL IGNITION FOR A LEAN BURN

TECHNICAL FIELD

The field of this invention relates to a combustion system for an internal combustion engine and more particularly to a combustion engine with a lean air/fuel ratio.

BACKGROUND OF THE DISCLOSURE

Conventional internal combustion engines achieve a relatively fast burn due to the substantially centralized position of the ignition source within the cylinder and the chemical composition of the mixture. The mixture is stoichiometrically correct or nearly so within 2 to 2.5 air/fuel ratios. However, if lean mixtures of the order exceeding 20:1 air/fuel ratio or higher are introduced into the conventional combustion chamber, the mixture may fail to ignite resulting in a total misfire. If initial ignition is achieved, the resulting flame kernel may be quickly quenched also resulting in total misfire. If the flame kernel is not quenched, the combustion proceeds very slowly and the cycle loses its efficiency, or is still burning when the exhaust valve opens. The excessively slow burn may be characterized as a partial misfire.

Lean burn engines that are designed to quickly burn air/fuel mixture ratios of approximately 20:1, but not substantially higher, have been developed and tested for many years. The benefits of lean burn engines include improved fuel consumption, the practically complete elimination of carbon monoxide and low amounts of unburnt hydro-carbons and oxides of nitrogen. These advantages are particularly noticeable under partial loads. However, these engines do not have much of a misfire limit if run at air/fuel ratios higher than 20:1, and at ratios lower than 20:1, produce excess $NO_x$. The operating limit, then, is very narrow and difficult to control. Switchover to a rich mixture (about 12.5:1) for maximum power output, if abrupt, produces uncontrollable drivability problems. If the switchover is gradual and progressive, on occasion the engine will find itself running at a combination of a high load point and air/fuel ratios around 16.5:1 where knocking is so prevalent as to result in a possible destruction of the engine.

The theoretical advantages of lean burn engines with a single spark-plug have been hindered by misfiring or by ignition that was either too early or too late in the combustion cycle. Previous constructions of lean burn combustion engines that attempted to control misfiring or knocking required complex and expensive approaches of questionable reliability. Alternatively, modified intake port designs have been incorporated which reduce the volumetric efficiency of the engine and thus limit the power output and versatility. Recently, there have been developments which incorporate four valve designs for increased air flow, swirling air motion, and three or more spark plugs positioned about the periphery of the combustion chamber to assure ignition. These engines only operate within the lean regime at some part loads and lower speeds, then switchover to stoichiometric or rich mixtures for higher loads and speeds. The reason that it these engines do not operate in a lean regime at full throttle is that only about 60% of the power potential is realized. Thus, these engines have only a partial lean burn capacity. Further, as earlier explained, the switchover can be very difficult, hard to accomplish, and detrimental to the engine's durability.

What is needed is a combustion engine that incorporates maximum air flow without swirl type air motion which deminishes flow capacity, orderly movement of the air-fuel mixture without decreasing air flow capacity and orderly combustion within the combustion chamber by dual ignition of the fuel/air mixture. These elements in conjunction with the physical and chemical principles of combustion produce positive ignition and fast burn.

The engine with the above fundamental requirements must operate at all conditions of load, speed, and ambient temperature to truly produce an efficient and low emission powerplant. The engine must produce its full output while operating in the lean regime at wide-open throttle (W.O.T.). As previously pointed out, no previous naturally aspirated engine operating lean (at about a 20:1 air/fuel ratio) and at W.O.T. produces more than about 65% of what a comparable engine produces when running with a rich mixture. Thus, to be able to produce the same potential power output, a supplemental air source must be provided. This engine charging can be either by a mechanical supercharger or by a turbocharger. Resultantly, the power potential of such an engine can be comparable to a rich-running counterpart and the engine can maintain good fuel economy, low emissions of HC, CO and $NO_x$, produce no particulates or visible emissions, and substantially decrease combustion noise. This engine can also start at normal ambient temperatures (75 degrees F.) without enrichment, and with minimal enrichment at colder temperatures. Present homogeneous-charge spark-ignited engines do not have these desirable start characteristics.

SUMMARY OF THE DISCLOSURE

In accordance with one aspect of the invention, an internal combustion engine has a cylinder and a piston movably disposed in the cylinder for reciprocal motion. A cylinder head is secured over the cylinder and piston to form a combustion chamber. At least one intake port and preferably two, extend through the cylinder head and an intake valve is mounted at each port through the cylinder head for allowing fuel-air mixture to be admitted into the combustion chamber. At least one exhaust port extends through the cylinder head and an exhaust valve is mounted to the cylinder head for allowing exhaust gases to exit the combustion chamber. A first igniter is mounted in the cylinder head between the two intake valves and the outside edge of the chamber, outbound of the intake valves. A second igniter is mounted in the cylinder head closer to a central longitudinal axis of the cylinder than the first igniter. A device actuates the first and second igniters in sequence with the first igniter being ignited before the second igniter.

Preferably, the combustion chamber has varying heights with the second igniter being positioned over a deeper section of the combustion chamber than the first igniter. Preferably, the second igniter is vertically positioned higher in the combustion chamber above the piston than the first igniter. In one embodiment, the second igniter is mounted closer to the exhaust valve than to the intake valve. The first igniter is mounted closer to the intake valve than to the exhaust valve. In one embodiment, the first igniter extends into the combustion chamber from a side wall thereof. The first and second igniters are preferably aligned with a central transverse axis of the cylinder that intersects the central longitudinal axis of the cylinder.

The intake port(s), intake valve(s), cylinder head and piston are desirably constructed to provide and promote air tumble within the combustion chamber about an axis that is substantially transverse to the central longitudinal axis of the cylinder.

According to another aspect of the invention, a first igniter and a second igniter are operably mounted in the cylinder head to be substantially vertically aligned above the piston. The second igniter is positioned closer to a central longitudinal axis of the cylinder than the first igniter. In broader terms, a fuel igniter device sequentially ignites the fuel and air mixture in the combustion chamber that is positioned directly within and above the piston at two different times with an initial ignition and a second ignition.

In accordance with a further aspect of the invention, a piston for an internal combustion engine has a concave recess with a variable width. The recess has a periphery being tapered with a narrow end and a wide section having a rounded end such that said periphery resembles a tear drop. The concave recess preferably has a variable depth, with the depth being relatively shallow at a narrow end and relatively deep at a wide section of the recess. The recess in one embodiment is asymmetrically shaped with a deepest part of the recess offset from the longitudinal axis of the recess. In an alternate embodiment, the recess is symmetrically positioned along a transverse center axis of said piston with a deepest part of said recess also aligned with said transverse center axis.

BRIEF DESCRIPTION OF THE DRAWINGS

Reference now is made to the accompanying drawings in which:

FIG. 4 is a cross-sectional plan view taken along line 4—4 shown in FIG. 2;

FIG. 5 is a plan view of the piston shown in FIG. 2;

FIG. 6 is a view similar to FIG. 4 illustrating a second embodiment of the invention;

FIG. 7 is a view similar to FIG. 5 illustrating a modified piston for use with the second embodiment;

FIG. 7a is a cross-sectional view taken along lines 7a—7a shown in FIG. 7;

FIG. 8 is a view similar to FIG. 4 illustrating a third embodiment of the invention;

FIG. 9 is a cross sectional view taken along lines 9—9 shown in FIG. 8;

FIG. 10 is a view similar to FIG. 7 illustrating the modified piston for use in the third embodiment;

FIG. 11 is a view similar to FIG. 2 illustrating a fourth embodiment of the invention.

DETAILED DESCRIPTION OF THE PREFERRED EMBODIMENT

Figure 1:
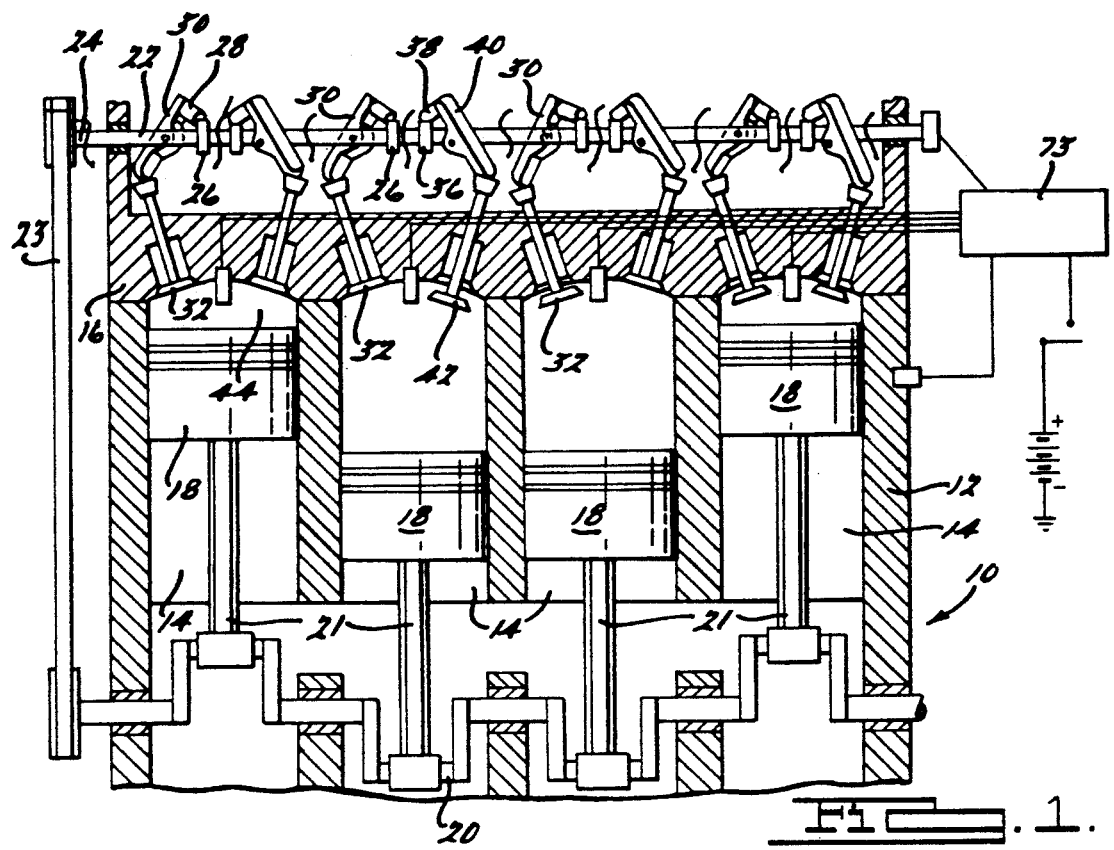
FIG. 1 is a schematic view of a four cylinder internal combustion engine incorporating one embodiment of the invention.

Referring now to FIG. 1, a four-valve twin overhead cam lean burn engine 10 is schematically represented. The lean burn engine 10 includes an engine block 12 with a plurality of cylinders 14. A cylinder head 16 is mounted on block 12. The cylinders 14 house pistons 18. Each piston 18 is conventionally connected to a crankshaft 20 through connecting rods 21. The crankshaft 20 is connected via a conventional timing mechanism (gear, chains or belts 23) to twin overhead camshafts 22 and 24. Camshaft 22 has cams 26 that operate tappets 28 that in turn pivot rocker arms 30. The arms 30 operate intake valves 32. Camshaft 24 similarly has cams 36 that operate tappets 38 that in turn pivot rocker arms 40. Rocker arms 40 operate exhaust valves 42. In another preferred application, the rocker arms 30 may bear directly against the stems of valves 32 and 42, respectively.

As shown in FIG. 4, a pair of intake valves 32 and exhaust valves 42 are associated with each cylinder 14. Reference to direction such as top, bottom, up, down, vertical, or horizontal will be made relating to the engine as shown in FIG. 1 with its conventional arrangement for a motor vehicle. It should be understood that the engine itself may be repositioned or reoriented such as rotated about its longitudinal or transverse axis without affecting the invention.

Figures 2, 3:
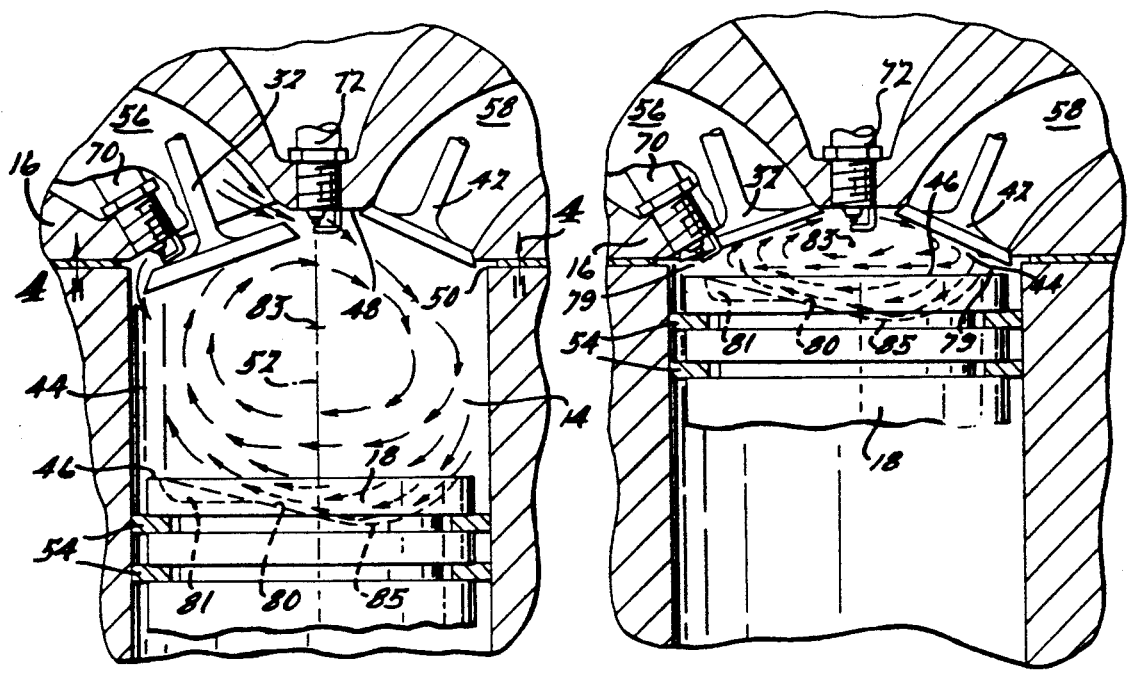
FIG. 2 is an enlarged schematic view of one cylinder of the internal combustion engine shown in FIG. 1 illustrating the intake stroke and the generated tumbling air motion.
FIG. 3 is a view similar to FIG. 2 illustrating the compression stroke and continued tumbling air motion.

Reference is now made to FIGS. 2, 3, 4 and 5, which illustrate one cylinder 14 and piston 18 assembly. The other three cylinder and piston assemblies shown in FIG. 1 are similar in structure and function, and therefore, are not individually described. The cylinder 14, piston 18, and cylinder head 16 form a combustion chamber 44. The piston 18 has a top surface 46 that defines the bottom wall 46 of the chamber 44. The cylinder head 16 forms the top surface 48 of the chamber 44. The cylinder 14 and cylinder head 16 together form the side wall 50 of chamber 44. The longitudinal central axis of the cylinder 44 is indicated at 52. The piston 18 has a ring pack 54. The cylinder head 16 has intake ports 56 and exhaust ports 58 in communication with a respective pair of intake valves 32 and a pair of exhaust valves 42. The valves 32 and 42 have a valve included angle preferably less than 30° and desirably being approximately 20° to 25° as shown in FIG. 2.

Each combustion chamber 44 has two igniters in the form of two spark plugs 70 and 72 mounted in the cylinder head 16 vertically aligned above the piston. In other words, the spark plugs are aligned with and positioned within a projection or extension of the cylinder. Each spark plug 70 and 72 is substantially aligned along a transverse axis 74 of the cylinder that preferably intersects the central longitudinal axis of the cylinder 52. The spark plug 70 is located in proximity to the intake valves 32 and more particularly between the two intake valves 32 toward the side wall 50, i.e. at the backside of the intake valves. The spark plug 72 is more centrally located toward the central axis 52 but preferably on the other side of central axis 52 than spark plug 70. The spark plug 72 is located in proximity to the exhaust valves 42. The spark plug 70 is sequenced to ignite before spark plug 72. The sequence is determined by an electronic ignition timer 73 connected to each spark plug 70 and 72.

The peripheral sections 76 and 78 of the cylinder head 16 form combustion chamber filler used to reduce the clearance volume in the cylinder head 16 to achieve high compression ratios while having a fair amount of clearance volume in the piston top. The peripheral sections 76 and 78 form squish areas 79 with the piston top surface 46 when the piston is at top dead center as shown in FIG. 3. The clearance volume provided by the contour of the cylinder head surfaces 76 and 78 is needed to help the air current within the combustion chamber turn around in a tumbling air motion about a horizontal axis 83 as shown in FIGS. 2 and 3. The squish areas 79 provide for increased micro-turbulence at the end of the compression stroke and during the early combustion phase. This moves the mixture radially inwards from the inactive area of the combustion chamber to the active area. This accelerates the mixture and increases the combustion rate.

The piston 18 has a concave recess 80 in the top surface 46 surrounded by a high peripheral rim 47. The recess 80 is generally circular or tear-drop shaped and has a variable depth. The depth being relatively shallow in proximity with the spark plug 70 and becoming deeper at a point away from spark plug 70 and toward spark plug 72. A pocket 81 may be in the piston to accommodate the protrusion of the spark plug 70 into combustion chamber 44. The deepest section 85 is approximately aligned under center transverse axis 74 and positioned on the other side of center axis 52 from the spark plug 70, substantially preferably along the longitudinal centerline of the exhaust valve 42. Consequently, the spark plug 72 is positioned approximately above a position between the cylinder axis 52 and the deepest section 85 and is also positioned substantially at the top of the combustion chamber 44 in the central section defined between all four valves, but in close proximity to the exhaust valves to be substantially above the deepest section 85 of the piston recess 80 and still be as far as possible from the first spark plug 70. The recess 80 is contoured in both directions along axis 74 (as shown in FIGS. 2 and 3) and transverse to axis 74. The high circumferential rim around the piston top surface 46 of piston 18 also acts as a clearance volume filler, contributing to obtain the high compression ratios desired for this system.

In operation, the engine has an intake stroke as illustrated in FIG. 2 with the air-fuel mixture passing through the open intake valve ports 56 into the combustion chamber 46. The intake ports 56 and chamber 46 are shaped to respectively produce and maintain vertical air-fuel mixture tumble about the horizontal axis 83 which is parallel to the centerline 87 of the engine 10. The air-fuel mixture tumble continues during the compression stroke as illustrated in FIG. 3, helped in part, by the concave shape of the piston bowl 85 which aids the turnaround of the air atop the piston.

Ignition of spark plug 70, i.e. the initial ignition, takes place shortly before the piston reaches top-dead center (TDC). The timing of ignition of the spark plug 70 is similar or more retarded to that of a conventional single spark plug combustion chamber operating near stoichiometric air/fuel ratio conditions. The spark plug 72 is sequentially activated after the first spark plug Depending on applications, load, speed, and design of the engine, the delay between the ignitions of spark plug 70 and spark plug 72 may vary between about 4° and 10° of crankshaft rotation.

The location of the spark plug 70 is aligned over a shallow section of the combustion chamber 44. In effect, the shallowness about the spark plug 70 render a high surface to volume ratio of the chamber in the vicinity of the spark plug 70. This high surface to volume ratio promotes a cooler average temperature and therefore a localized denser and richer mixture condition. Before, during, and just after ignition by spark plug 70, the mixture exiting the relatively large squish areas surrounding and behind spark plug 70 is coole, denser, and richer because of the high surface area to volume ratios of the squish volumes. This assures ignition by spark plug 70 and prevents flame quenching by the overall leaner air/fuel mixtures in the remainder of the combustion chamber. The restricted volume in proximity to the spark plug 70 is a small proportion of the total chamber volume so that the deleterious effects of such high surface to volume ratios are kept under control by the relatively small volume involved. The otherwise undesirable effects of this small volume is more than offset by its desirable effect in guaranteeing positive ignition and its anti-flame quenching characteristic. The initial ignition of the spark plug 70 does not proceed very fast because it is contained within the high surface to volume section of the chamber which tends to cool and slow down the flame front. Secondly, the lean overall mixture also tends to slow down the combustion process. The large amounts of cooler and denser mixture, richer in air/fuel ratio than the overall composition of the mixture in the chamber, exiting from the relatively large squish areas surrounding the spark plug 70, and generating highly turbulent conditions about said spark plug 70, assure positive ignition of an otherwise unignitable mixture at the very lean overall air/fuel ratio within the chamber. $NO_x$ production of this early ignited mixture is very low for the flame is cool due to the large S/V ratio. The initial ignition generates free ions or free radicals which move about at velocities higher than those of the flame front of the flame kernel from the initial ignition and with the unidirectional air flow from left to right as illustrated in FIGS. 2 and 3 at the level of the spark plugs, the flame front also tends to progress from left to right towards spark plug 72. The formation and motion of the radicals towards the larger volumes of the chamber essentially serve to condition the mixture about the spark plug 72 for sequential or secondary ignition of the surrounding mixture before the flame front from the initial ignition reaches it. The secondary ignition is in a space with relatively lower surface to volume ratio The secondary ignition and subsequent combustion proceeds quickly due to the pre-flame conditions, and motion of the free radicals, micro turbulence generated by the squish areas as the piston further approaches TDC in closer synchronism with the secondary ignition, higher temperature of the localized mixture due to radiation from the initial flame front, lower surface to volume ratio of the local space about the spark plug 72, the proximity of the hot exhaust valves, and the more centralized and close-coupled location of the secondary spark plug 72 relative to the larger volumes of the combustion chamber 44.

The exhaust cycle is conventional with exhaust valves 42 opening during the exhaust cycle to let the exhaust gases exit through exhaust ports 58.

Reference is now made to FIG. 6, 7 and 7a which illustrate a second embodiment. In this embodiment, only a single exhaust valve 156 is mounted in a slightly different cylinder head 116. The secondary ignition source is a spark plug 172 that is mounted eccentrically with respect to the axis 174 through the center of the chamber 44, its position being defined by packaging rather than combustion related issues. The recess 180 in piston 118 is similar to the one in the first embodiment in that it has a variable depth. The periphery 182 is tear-drop shaped with the narrow section 184 positioned in proximity to the primary spark plug 170. The width increases toward the secondary spark plug 172.

The recess 180 in piston 118 is also preferably eccentrically rotated such that its axis 185 is canted with respect to transverse axis 174 of the cylinder. The depth is relatively shallow in proximity with the spark plug 170 and becomes deeper in proximity to spark plug 172. The wide portion 186 is axially aligned with the deepest section 181. Furthermore, the recess 180 is preferably asymmetrically shaped with the deepest part 181 of the recess offset from the longitudinal axis 185 of said recess. The spark plug 172 is eccentrically positioned from the longitudinal axis 185 of the recess and is offset toward the same side of the longitudinal axis 185 of said recess as the deepest section 181 of the recess.

Reference is now made to FIGS. 8, 9, and 10 that disclose yet another modified form of the invention. For packaging reasons, the spark plug 270 that provides the initial ignition has its longitudinal axis disposed along a substantially horizontal axis 274 perpendicular to the vertical axis 52 of the cylinder. The spark plug 270 intrudes from a side wall 250 of the combustion chamber. The spark plug 270 intrudes along the axis 274 that extends between the two intake valves 232. The recess 280 in piston 218, as shown in FIG. 10, is similar to the one in the second embodiment in that it has a variable depth and width. The periphery 287 is tear-drop shaped with the narrow section 284 positioned in proximity to the spark plug 270. The width increases toward the spark plug 272 The recess 280 in piston 218 has its axis 282 aligned with transverse axis 274 of the cylinder The depth is relatively shallow in proximity with the spark plug 270 and becomes deeper in proximity to spark plug 272. The wide portion 286 is axially aligned with the deepest section 281.

FIG. 11 illustrates another modification to the invention. In this embodiment, the combustion chamber 344 is substantially formed within the recess 380 of piston 318. The cylinder head 318 has a relatively flat bottom surface 320 and the valve included angle is set at substantially 0°. Both spark plugs 370 and 372 extend substantially vertically downwardly into the combustion chamber 344. The recess 380 in piston 318 is similar to the one in the third embodiment in that it has a variable depth and width. The periphery 382 is tear-drop shaped similar to periphery 282 in FIG. 10 with the narrow section 384 positioned in proximity to the spark plug 370. The width increases toward the spark plug 372. The recess 380 in piston 318 has its central horizontal axis preferably aligned with the transverse axis of the cylinder. The depth is relatively shallow in proximity with the spark plug 370 and becomes deeper in proximity to spark plug 372. The wide portion 386 is axially aligned with the deepest section 381.

The operation of the alternate embodiments are substantially the same as described for the first embodiment. The initial ignition is caused by the spark plug that is at the shallower section of the combustion chamber that has a smaller volume, higher surface to volume ratio and large squish areas surrounding it. The secondary ignition is from the spark plug that is more centrally located and is in the area of the chamber that has a lower surface to volume ratio, larger volume, and is closer to the hot exhaust valves. All these are designed to promote fast secondary combustion. The secondary ignition is delayed with respect to the initial ignition. Both spark plugs are aligned substantially vertically over the piston within the perimeter of the cylinder.

It is in this fashion that a very quick overall combustion can be achieved from a lean mixture of air and fuel. The overall combustion while proceeding rapidly, produces a clean and efficient burn, with low emissions of hydrocarbons, CO, $NO_x$, smoke, and particulates. The retardation of the secondary ignition can further reduce the combustion and mechanical noise, mechanical stresses, wear and $NO_x$ production without an increase in hydrocarbons, smoke and particulates typical of a sparkignition engine run at retarded ignition timing which causes partial or total misfires. Furthermore, since the initial amount of fuel being ignited is substantially less than the full amount of fuel consumed in the combustion cycle, the amount of $NO_x$ generated by the initial ignition is reduced. Furthermore, the firing pressures and rates of pressure rise produced by the initial ignition are lower, which reduces the structural stresses on the engine and results in lower friction and wear, as well as combustion and mechanically-generated noise. Combustion is very smooth and quiet, with the extremely fast main combustion occurring relatively late in the cycle, essentially after T.D.C. Thsi contributes to low firing pressures and $NO_x$ generation.

In essence, the combustion mechanism could be defined as a two-stage combustion cycle for lean mixtures on an homogeneously charged air-fuel mixture The air and fuel can be mixed either centrally or at the intake ports by multi-port type fuel injection (MPI) and sent via said intake ports into each cylinder. The shape of the combustion chamber inherently causes variations in the density and temperature of the air/fuel mixture which can then be sequentially ignited at two different locations at two different times. The tumbling air motion and squishgenerated micro turbulence greatly aid to achieve a quick burn.

Variations and modifications are possible without departing from the scope and spirit of the present invention as defined by the appended claims.

The embodiments in which an exclusive property or privilege is claimed are defined as follows:

1. In an internal combustion engine having a cylinder and a piston movably disposed in said cylinder for reciprocal motion, a cylinder head secured over said cylinder and piston to form a combustion chamber, two intake ports extending through said cylinder head and two intake valves mounted in said cylinder head for allowing fuel-air mixture to be admitted into said combustion chamber, at least one exhaust port extending through said cylinder head and an exhaust valve mounted to said cylinder head for allowing exhaust gases to exit said combustion chamber, the improvement characterized by:
   a first igniter mounted in said cylinder head between said two intake valves;
   a second igniter mounted in said cylinder head closer to a central longitudinal axis of said cylinder than said first igniter;
   means for actuating said first and second igniters in sequence with said first igniter being ignited before said second igniter.

2. In an internal combustion engine having a cylinder and a piston movably disposed in said cylinder for reciprocal motion, a cylinder head secured over said cylinder and piston to form a combustion chamber, at least one intake port extending through said cylinder head and at least one intake valve mounted in said cylinder head for allowing fuel air mixture to be admitted into said combustion chamber, at least one exhaust port extending through said cylinder head and an exhaust valve mounted to said cylinder head for allowing exhaust gases to exit said combustion chamber, the improvement characterized by:

a first igniter and a second igniter in said cylinder head substantially vertically aligned above said piston, said second igniter positioned closer to a central longitudinal axis of said cylinder than said first igniter;

means for actuating said first and second igniters in sequence with said first igniter being ignited before said second igniter.

3. An internal combustion engine as defined in claim 2 further characterized by;

said combustion chamber having varying heights, said second igniter being positioned over a taller section of said combustion chamber than said first igniter.

4. An internal combustion engine as defined in claim 3 further characterized by;

said second igniter being positioned vertically higher in said combustion chamber above said piston than said first igniter.

5. An internal combustion engine as defined in claim 4 further characterized by;

said second igniter mounted closer to said exhaust valve than said intake valve and said first igniter mounted closer to said intake valve that said exhaust valve.

6. An internal combustion engine as defined in claim 5 further characterized by:

said intake valve, cylinder head and piston constructed to provide air tumble within said combustion chamber about an axis that is substantially transverse to the central longitudinal axis of said cylinder.

7. An internal combustion engine as defined in claim 6 further characterized by;

said first igniter extending into said combustion chamber from a side wall.

8. An internal combustion engine as defined in claim 7 further characterized by;

said first and second igniter being substantially aligned with a center transverse axis of said cylinder that intersects the center longitudinal axis of said cylinder.

9. An internal combustion engine as defined in claim 2 further characterized by;

said first igniter extending into said combustion chamber from a side wall.

10. An internal combustion engine as defined in claim 9 further characterized by;

said first and second igniter being substantially aligned with a center transverse axis of said cylinder that intersects the center longitudinal axis of said cylinder.

11. An internal combustion engine as defined in claim 9 further characterized by;

said piston having a concave recess with a variable width, said recess having a periphery being tapered with a narrow end and a wide section.

12. An internal combustion engine as defined in claim 11 further characterized by;

the concave recess having a variable depth, said depth being relatively shallow at said narrow end and relatively deep at said wide section.

13. An internal combustion engine as defined in claim 12 further characterized by:

said recess being asymmetrically shaped with a deepest part of said recess offset from the longitudinal axis of said recess, said second igniter eccentrically positioned from the longitudinal axis of said recess and being offset toward the same side of said longitudinal axis of said recess as said deepest part of said recess.

14. An internal combustion engine as defined in claim 4 further characterized by;

said piston having a concave recess with a variable width, said recess having a periphery being tapered with a narrow end and a wide section.

15. An internal combustion engine as defined in claim 14 further characterized by;

the concave recess having a variable depth, said depth being relatively shallow at said narrow end and relatively deep at said wide section.

16. An internal combustion engine as defined in claim 15 further characterized by:

said recess being asymmetrically shaped with a deepest part of said recess offset from the longitudinal axis of said recess, said second igniter eccentrically positioned from the longitudinal axis of said recess and being offset toward the same side of said longitudinal axis of said recess as said deepest part of said recess.

17. In an internal combustion engine having a cylinder and a piston movably disposed in said cylinder for reciprocal motion, a cylinder head secured over said cylinder and piston to form a combustion chamber, at least one intake port extending through said cylinder head and at least one intake valve mounted in said cylinder head for allowing a fuel/air mixture to be admitted into said combustion chamber, at least one exhaust port extending through said cylinder head and an exhaust valve mounted to said cylinder head for allowing exhaust gases to exit said combustion chamber, the improvement characterized by:

an igniter device for sequentially igniting said fuel/air mixture in said combustion chamber at two different times with an initial ignition and a second ignition;

said piston having a concave recess with a variable width, said recess having a periphery being tapered with a narrow end and a wide section.

18. An internal combustion engine as defined in claim 17 further characterized by;

the concave recess having a variable depth, said depth being relatively shallow at said narrow end and relatively deep at said wide section.

19. An internal combustion engine as defined in claim 18 further characterized by:

said recess being asymmetrically shaped with a deepest part of said recess offset from the longitudinal axis of said recess, said second igniter eccentrically positioned from the longitudinal axis of said recess and being offset toward the same side of said longitudinal axis of said recess as said deepest part of said recess.

20. An internal combustion engine as defined in claim 17 further characterized by;

said igniter device being substantially vertically aligned directly over said piston within the projection of said cylinder.

21. A piston for an internal combustion engine, said piston characterized by;

said piston having a concave recess with a variable width, said recess having a periphery being tapered with a narrow end and a wide section having a rounded end such that said periphery resembles a tear drop.

22. A piston as defined in claim 21 further characterized by;

the concave recess having a variable depth, said depth being relatively shallow at said narrow end and relatively deep at said wide section.

23. A piston as defined in claim 22 further characterized by:

said recess being asymmetrically shaped with a deepest part of said recess offset from the longitudinal axis of said recess.

24. A piston as defined in claim 22 further characterized by:

said recess being symmetrically positioned along a transverse center axis of said piston with a deepest part of said recess also aligned with said transverse center axis.

* * * * *